Sept. 24, 1940.   C. J. DOYLE   2,216,069
TELEMETRIC SYSTEM FOR REMOTE INDICATION
Filed Oct. 9, 1937   7 Sheets-Sheet 1

Inventor
CHARLES J. DOYLE

Sept. 24, 1940.  C. J. DOYLE  2,216,069
TELEMETRIC SYSTEM FOR REMOTE INDICATION
Filed Oct. 9, 1937  7 Sheets-Sheet 4

CHARLES J. DOYLE

Sept. 24, 1940.  C. J. DOYLE  2,216,069
TELEMETRIC SYSTEM FOR REMOTE INDICATION
Filed Oct. 9, 1937   7 Sheets-Sheet 6

Inventor
CHARLES J. DOYLE
By
Attorneys

Patented Sept. 24, 1940

2,216,069

UNITED STATES PATENT OFFICE 2,216,069

TELEMETRIC SYSTEM FOR REMOTE INDICATION

Charles J. Doyle, Beaumont, Tex.

Application October 9, 1937, Serial No. 168,273

11 Claims. (Cl. 73—313)

This invention relates to a telemetric system for giving remote indications.

One of the features of the present invention is the provision of means for tentatively establishing a pre-selection at a transmitting unit corresponding to the existing status of the variable which is to be indicated at a remote point: with means for energizing the transmitting unit for transfer of the information set up by pre-selection, to the remote point.

Another feature of the invention is the provision of a mechanical system for selectively positioning electric contactors in response to change of a variable, together with means for establishing a flow of electrical energy through the pre-selected contacts when a reading is to be accomplished, and with means for preventing erroneous readings at points of transition in these readings.

A further feature of the invention is the provision of a plurality of transmitting units for tentatively establishing circuits at a plurality of devices, each in response to the variations of a variable in the particular device, together with selector means for establishing a flow of energy to a unit for a selected one of the devices, in order to obtain an indication of the existing condition of the variable.

Other features of the invention reside in constructional arrangements and assemblies of the parts, as will appear in the course of the following specification and claims. An illustrative form of practicing the invention is set out on the accompanying drawings, in which the invention is shown as applied for reading the liquid level or depth in a plurality of vessels such as the oil tanks at an oil farm.

Figure 1:
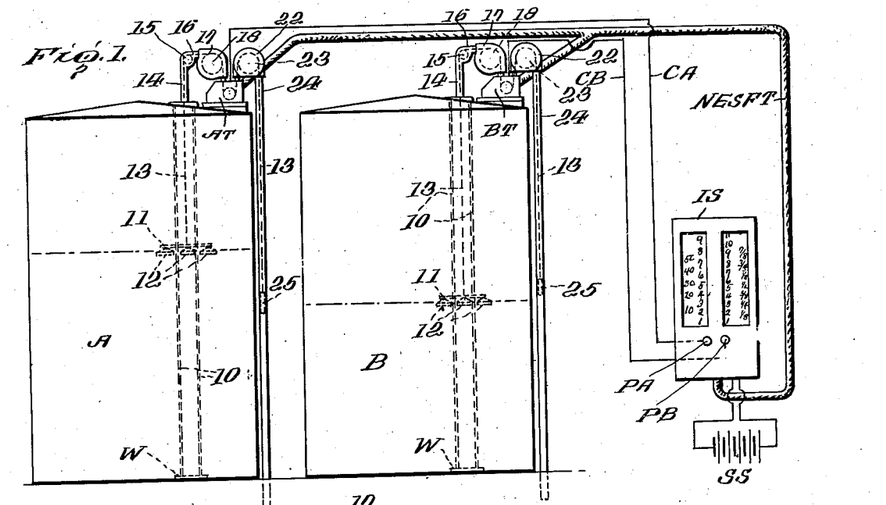
Figure 1 is a conventionalized diagram showing the connection of an indicating apparatus to transmitting devices for two storage tanks.

In Figure 1, two tanks A and B are indicated as being of the closed type employed for fuel oil, gasoline, etc. An indicating station IS is provided which has columns of indicating devices, illustratively herein comprising selectively energized lamp bulbs behind numeral designations, by means of which the liquid level in the tanks may be indicated by selectively depressing the push buttons PA, PB corresponding to the tanks A and B. A source of supply SS may be the battery as illustrated, or may be the secondary of a step-down transformer. It has been found that the system can be operated with a voltage of six volts, so that there is no considerable danger in utilizing the electric currents near inflammable vapors. The indicating station IS is connected by a cable NESFT which comprises a number of groups of conductors as will be described hereinafter more particularly with reference to Figure 13: these conductors being joined to corresponding parts in the several transmitting devices AT and BT. On the other hand, the push buttons PA and PB are individualized with respect to the corresponding transmitting devices AT and BT, and are connected thereto by the respective common supply conductors CA and CB. Since the arrangement may be identical for the several tanks, only two tanks are illustrated, and the details of connections for only a single tank will be set out hereinafter.

Figure 3:
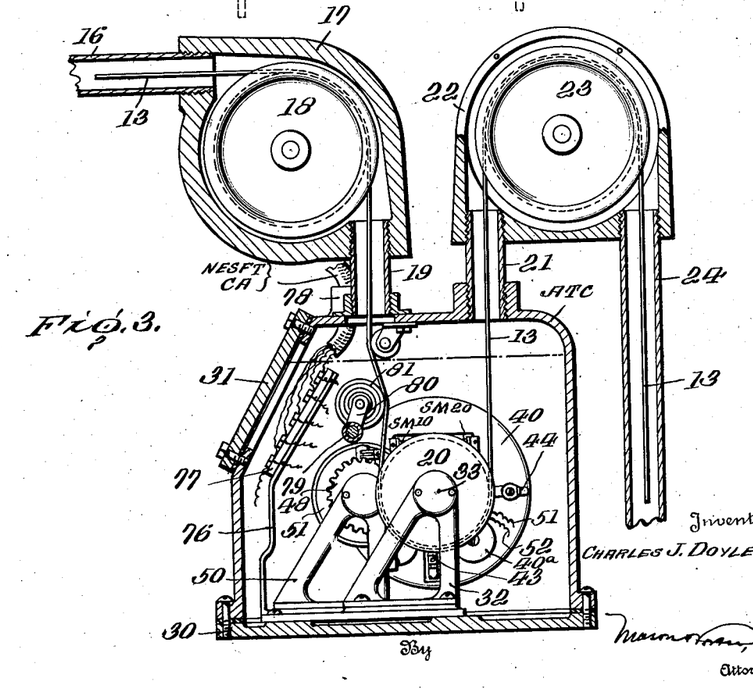
Figure 3 is an upright sectional view through transmitting devices, substantially on line 3—3 of Figure 5.
Figure 4:
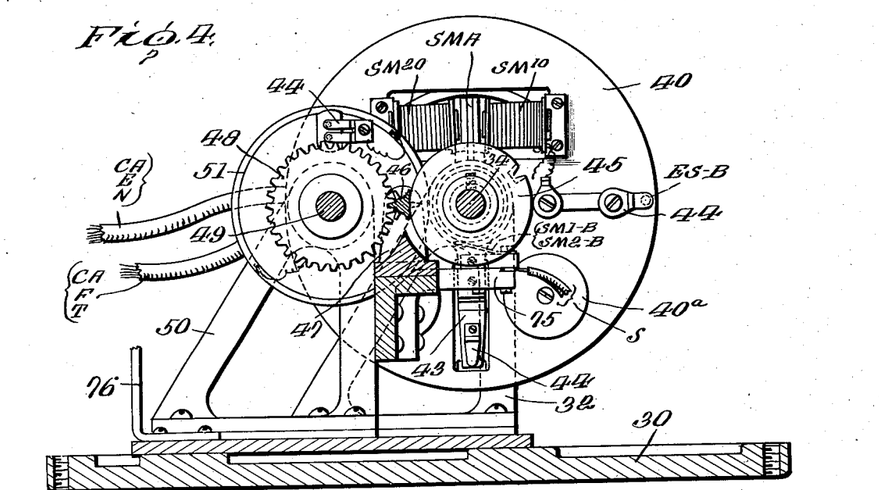
Figure 4 is a similar sectional view, on a larger scale than Figure 3, substantially on line 4—4 of Figure 5.

Within each tank, a weight W holds two guide wires 10 in vertical position, these wires being connected at the top of the corresponding tank and passing upward through loops (not shown) of a bridge 11 of a float device having the three spaced floats 12 thereon. A tape 13 passes upwardly from the float and through a pipe 14 and around a guide pulley 15, and thence through a further pipe connection 16 into a housing 17 and over a guide pulley 18 therein. The housing 17 is supported from a main transmitting device casing ATC by a length of pipe 19, through which the tape 13 passes (Figure 3). The tape then engages the driving pulley 20, and its direction is thereby turned through 180° so that it passes upward again through a further length of pipe 21 which supports a further housing 22 receiving a guide pulley 23 by which the tape is guided to pass into the downwardly extending pipe 24 which receives and guides a counterweight 25 at the outer end of the tape 13. This counterweight 25 balances the system and permits the structure to operate with a pull of the order of four ounces. It will be noted that the several pipes are sealed with respect to their housings and connections, so that there is provided no general escape for inflammable vapors.

The transmitting device housing ATC comprises an upper structure, a base 30 and a sealable closure plate 31. These structures are sealed with respect to one another so that the housing can be filled with transformer oil, whereby all electrical terminals and contacts are submerged in oil and there is no danger of ignition of any explosive vapors.

Figure 5:
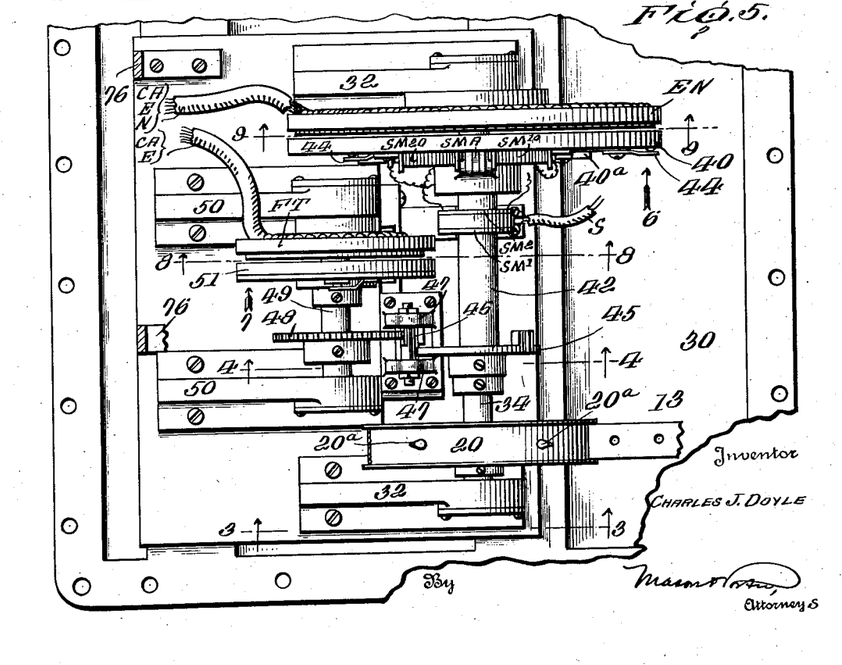
Figure 5 is a horizontal plan view of a transmitter device, with the casing and terminal board removed.

The base plate 30 of the transmitting device housing supports a pair of pillars 32 which receive bearings 33 for a shaft 34 to which the driving pulley 20 is secured. This driving pulley is provided with flanges at its edges for guiding the tape, and has the pins 20a which are spaced to engage in apertures of the tape 13, of which a portion is shown in Figure 5 as having holes spaced accurately one inch apart, while the driving pulley 20 has four pins spaced at 90° apart around the periphery of the pulley, the pulley itself being exactly twelve inches in circumference. Thus, a single revolution of the pulley 20 and shaft 34 corresponds to a change in liquid level in the tank of precisely twelve inches.

Figure 6:
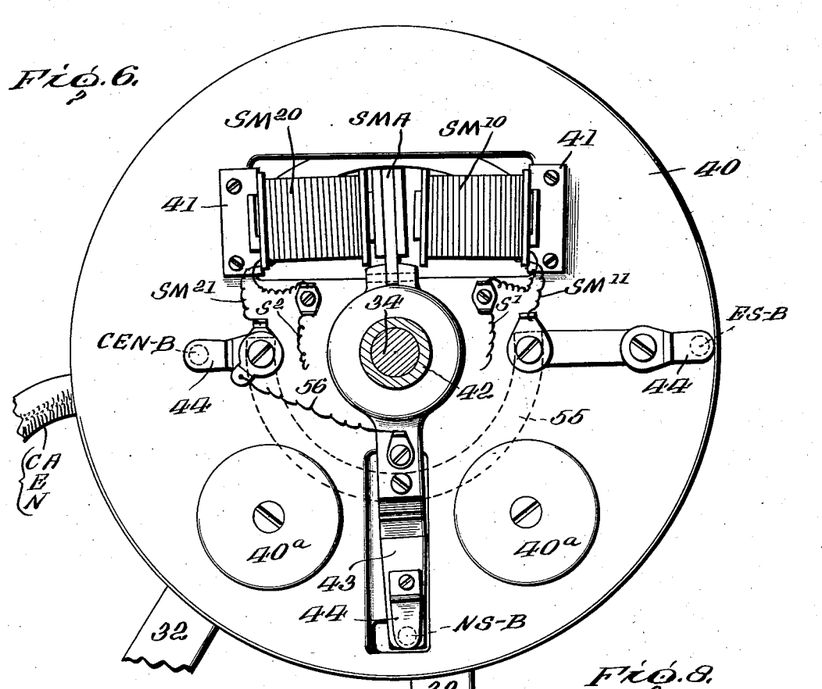
Figure 6 is a view, on a still larger scale, of the rotating plate for the "inches" disk, this view being taken substantially in the direction of the arrow 6 in Figure 5.

The shaft 34 is fixedly connected with a rotatable plate 40 which may be referred to as the "inches" rotatable plate, as this plate makes one full revolution in indicating twelve inches and the desired fractions thereof. As shown in Figure 6, this plate is provided with the brackets 41 which support two coils SM—10, SM—20 for energizing an armature SMA. These coils and the armature together provide a stepper motor SM as will be described in detail hereinafter. The armature SMA has a sleeve 42 supported for free movement on the shaft 34, and includes an extension 43 which receives a brush NS—B, a flat spring 44 being provided to force this brush parallel to the axis of the shaft 34, and into contact with an "inches" segment ring NS. The sleeve 42 (see Figures 5 and 6) has an insulating body thereon with two collector rings SM—1, SM—2, and also has a Geneva disk 45 for engagement with the mutilated Geneva transfer pinion 46 which is supported on a bearing bracket 47 and serves to intermittently rotate the gear 48 which is fixed on the "feet" shaft 49, which in turn is supported by upstanding brackets 50 connected to the base 30. Thus, upon the completion of the rotation of a single revolution of the sleeve 42, the Geneva structures 45, 46 operate to cause a stepping of the gear 48 through a given angle equal to the arcuate length of contact segments on the "feet" ring FS.

Figure 7:
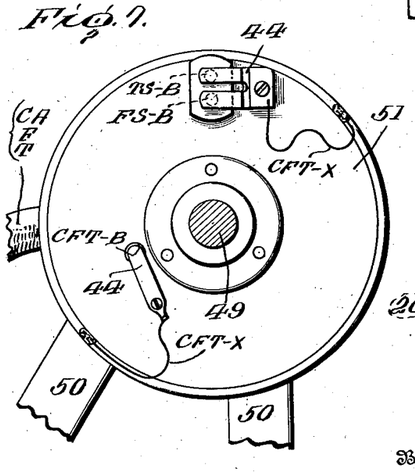
Figure 7 is a corresponding view of the "feet" structure, being taken substantially on the arrow 7 of Figure 5.

The shaft 49 is connected to the insulating plate 51 which may be referred to as the rotatable "feet" plate. As shown in Figure 7, this plate 51 has three apertures parallel to its axis for receiving three brushes CFT—B, TS—B, FS—B for engagement with segment rings as described hereinafter. Spring fingers 44 are also provided on this plate for assuring the proper contact of the brushes with the corresponding segment rings.

Further, in Figure 6, it will be noted that the rotating insulating plate 40 has axially directed apertures for receiving the brushes ES—B and CEN—B: each of these brushes being provided with a spring finger 44. Conductors are provided for connecting the three brushes together, including the arcuate member 55 and the pigtail conductor 56. Further, one terminal of each of the coils SM—10, SM—20 is connected by a conductor SM—11, SM—21 with these brushes.

In order to provide a proper distribution and balance of weights in the rotatable plate 40, calibrated counterweights 40a are suitably disposed and secured.

Figure 13:
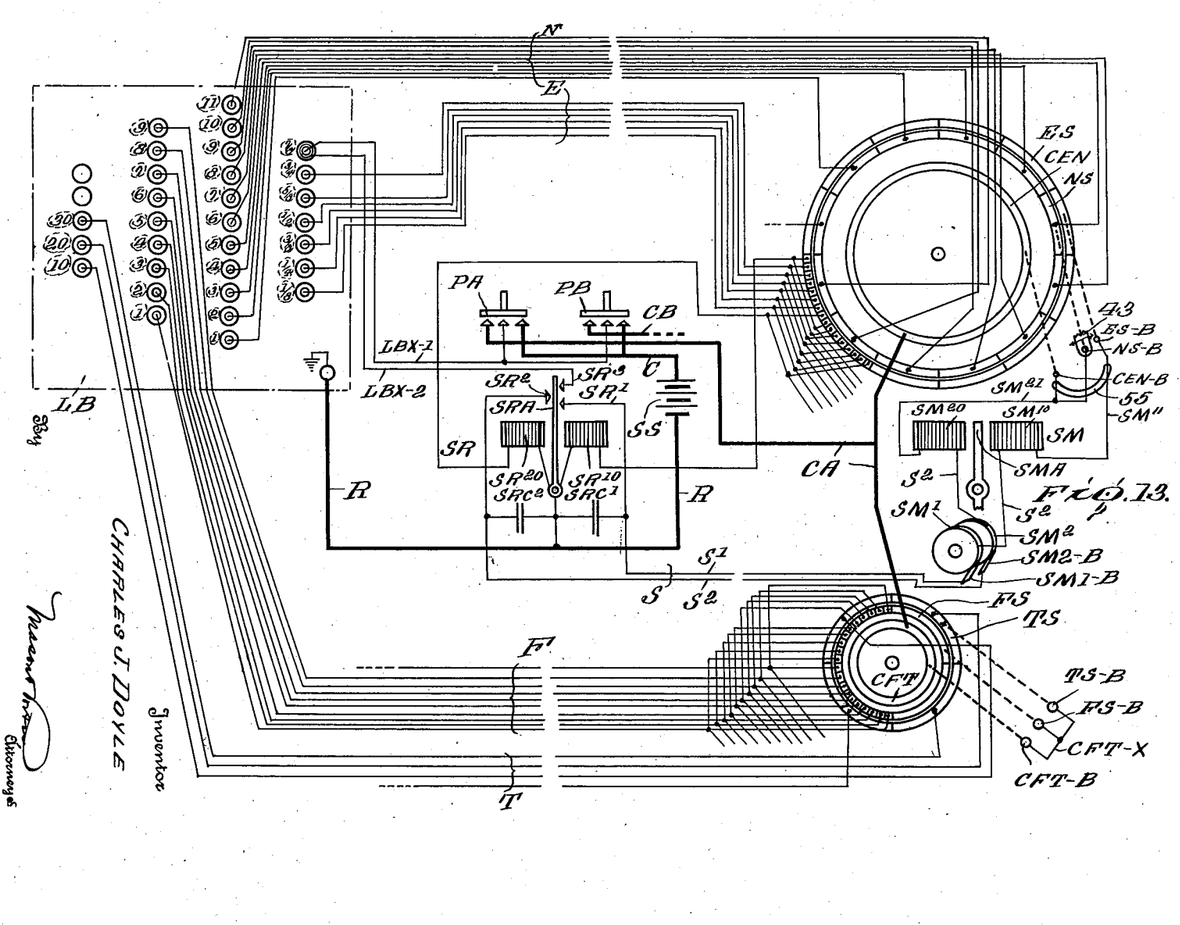
Figure 13 is a general circuit view showing the connection between one transmitting device and an indicating structure or receiving board provided with selecting switches for two such transmitting devices.

As shown in Figures 5, 9, 11 and 13, the "inches" disk EN is made of insulating material and has three contact rings on the face adjacent the revoluble "inches" plate 40. The innermost ring CEN is solid and is held in place by screws 61 (Figure 11) extending through the disk itself: one of these screws is connected to a common supply conductor CA, as indicated on Figure 13. The middle ring NS is divided into twelve segments corresponding to the number of inches in a foot. These segments are held in position by pairs of screws 62 located adjacent the ends of the individual segments. A conductor extends from each of these segments, being connected to one of the screws of the corresponding pair, and forms part of a cable N (Figure 13). Since, in the illustrated structure there is no indication of "zero" readings, the conductor for the "zero" segment may be omitted, or may be left open-circuited.

Figure 11:
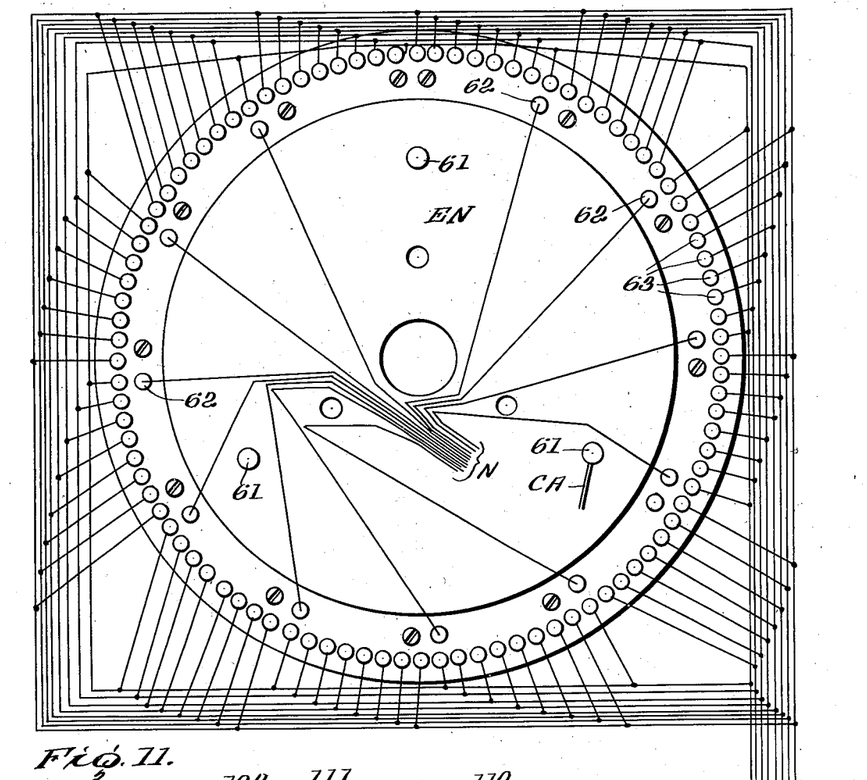
Figure 11 is a corresponding view for the "inches" disk, and showing certain connections thereof.

The outer ring ES is divided into twelve groups of individual contact segments, each group consisting of eight segments corresponding to "eighths" of an inch, for the indications given; there being ninety-six such segments in the circumference of the ring. Each segment is held in place by a screw 63 passing through the plate. Corresponding segments in each group are electrically connected together as shown in Figures 11 and 13. Thus, each of the segments on ring ES which is located adjacent in a clockwise direction to the radial line extending through the gap between each pair of "inch" contact segments NS (Figure 9) are connected together, and so on in order. Thus, there is a repetition of readings in the "eighths" column of the indicating station twelve times during a single revolution of the revoluble plate 40, once for each successive indication of an inch change in level.

Figure 8:
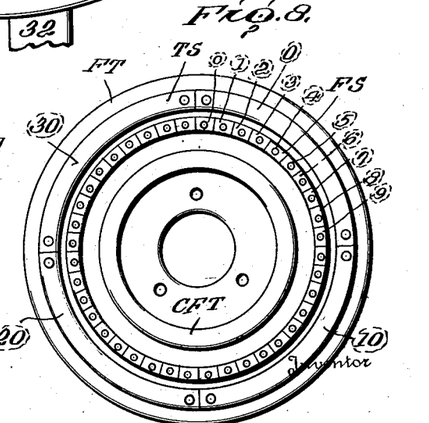
Figure 8 is a sectional view, on the scale of Figure 7, substantially on line 8—8 of Figure 5.
Figure 9:
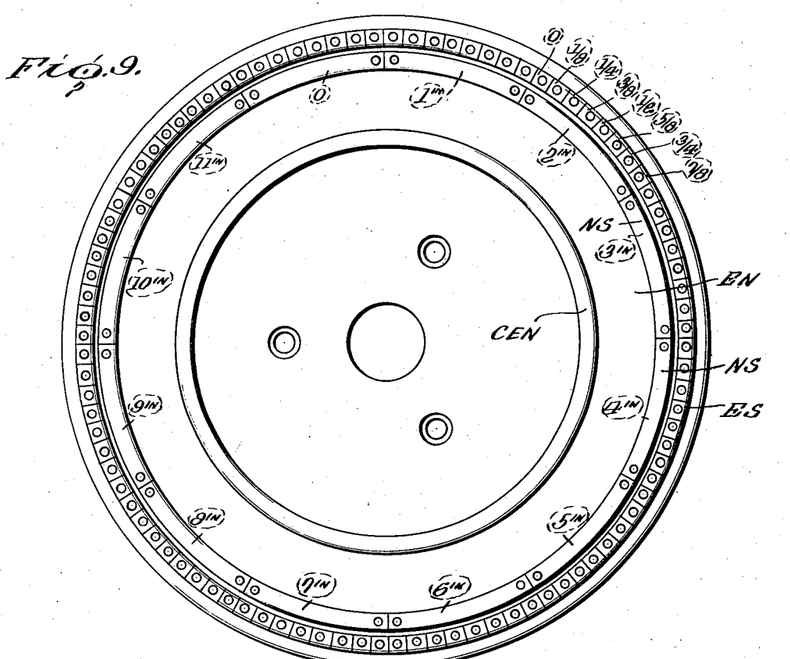
Figure 9 is a corresponding view of the segment rings for the "inches" disk, essentially as seen at plane 9—9 of Figure 5.
Figure 10:
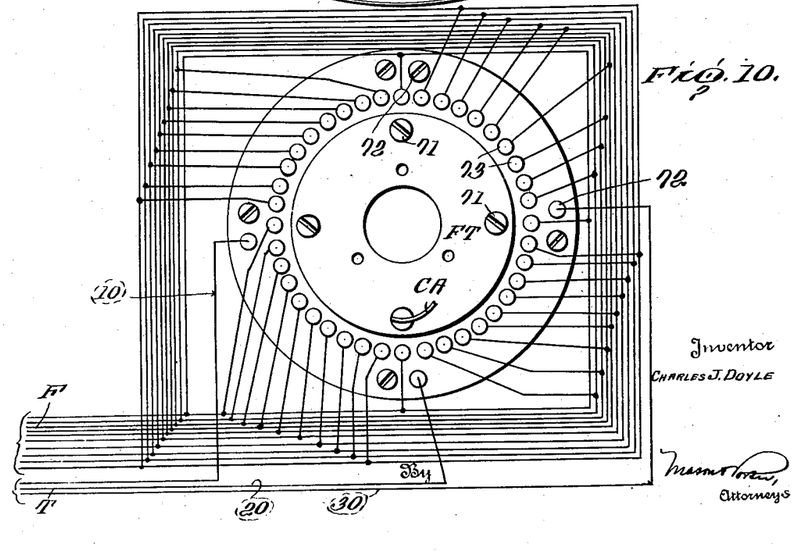
Figure 10 is a view of the rear side of the "feet" disk, with certain electrical connections indicated.

The "feet" disk FT is similarly provided with three contact rings CFT, FS and TS (Figures 8, 10 and 13). The inner ring CFT is closed and connected to the common conductor CA. The outer ring TS is shown as divided into four segments, each extending through nearly 90° of arc: one of these segments is engaged by a brush TS—B whenever the liquid level in the tank is more than zero and less than 10 feet; the next is engaged when the contents are more than 10 feet and less than 20 feet, the third is engaged when the contents are more than 20 feet and less than 30 feet; while the fourth is utilized for readings from 30 feet to 40 feet. The illustrated structure thus can be employed for reading changes in liquid level which do not exceed 40 feet. Each of these segments is held in place by a pair of screws 72, one screw of each pair being connected to one of the conductors in cable T, except for the zero segment, where the conductor may be omitted or left open-circuited.

The middle ring FS is divided into a number of groups of segments; ten segments being provided in each group, and each group corresponding in arcuate length to the length of one of the "tens" segments on ring TS. Each of these "feet" segments on ring FS is held in place by a screw 73 which is connected to a conductor in the cable F. Since these segments are also decimal repeating, similar to the "eighths" segment on ring ES, the corresponding segments in each group are connected together as shown in Figs. 10 and 13.

It will be noted that the "feet" disk FT and the "inches" disk EN each have a plurality of segments, with each segment of a higher value parallelled by a group of segments of sub-multiple or fractional value. These sub-multiple or fractional segments provide contacts for each group having an arcuate length corresponding to an integer value in the next higher denomination.

A bracket 75 extends from bracket 50 and supports a pair of brushes SM1—B and SM2—B for engaging the collector rings SM1 and SM2. These brushes are connected to conductors S1 and S2 in a cable S.

From Figure 3, it will be noted that a bracket 76 is connected to the base 30 for receiving a terminal board 77 of insulating material, this terminal board being provided with binding posts to which connection may be made from the conductors in cables NESFT and the common conductor CA, CB . . . of the particular transmitting device, these cables and conductors being assembled in a single sheath and brought out through a liquid-tight connection 78. Within the housing ATC, conductors are run from the terminal board to the screws and contacts as described above. Since the terminal board is accessible by removing the closing plate 31, this provides an easy manner of installing and checking the apparatus.

A shaft 79 extends through the wall of the housing ATC and is provided with means (not shown) by which it may be rocked and locked. This shaft 79 has a crank arm 80 inside of the housing for supporting a roller 81 which is presented against the tape 13, so that by changing the angle of the crank arm 80 an adjustment of the tape can be effected in initially calibrating the apparatus. Since the tape 13 has holes at every inch for engagement with the pins on the driving pulley 20, the tape itself may be shifted to within an inch of the desired position in initially setting the device for "zero": and then the further exact calibration is attained by rocking the shaft 79 and then securing it in adjusted position.

Figure 2:
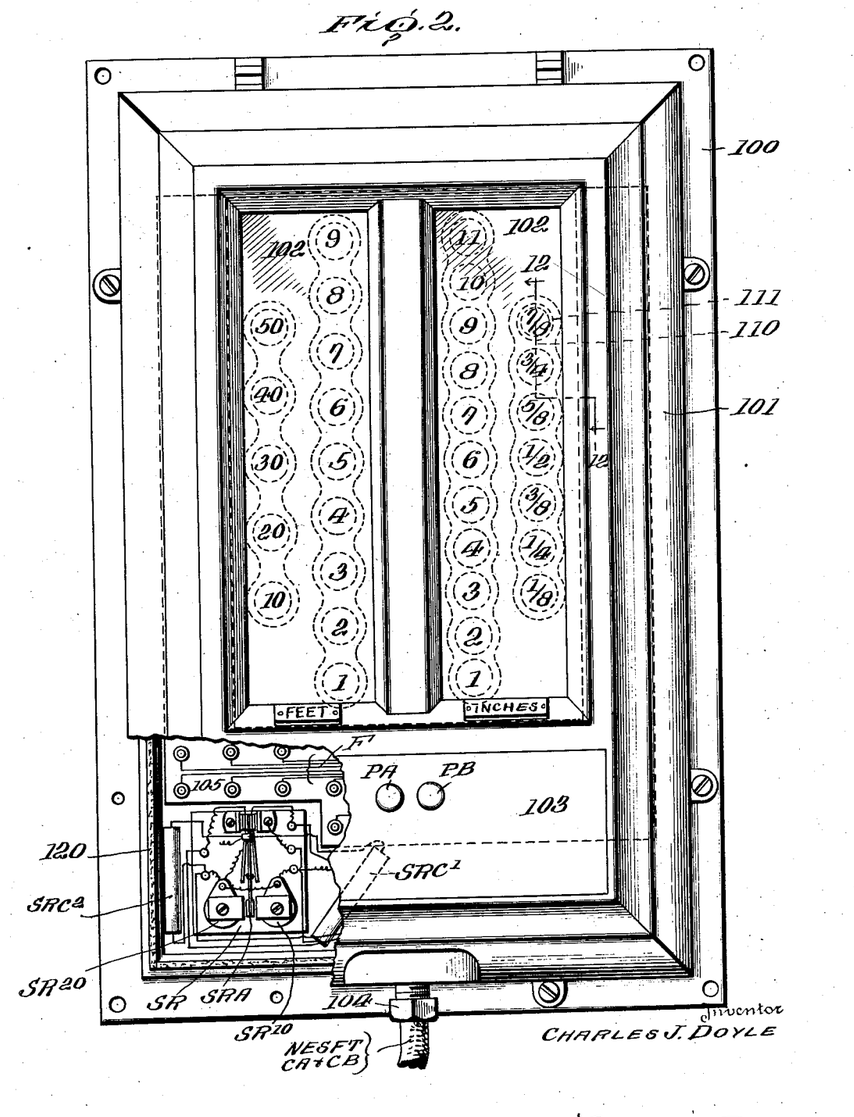
Figure 2 is a face view on an enlarged scale, with parts broken away, showing an indicator structure.
Figure 12:
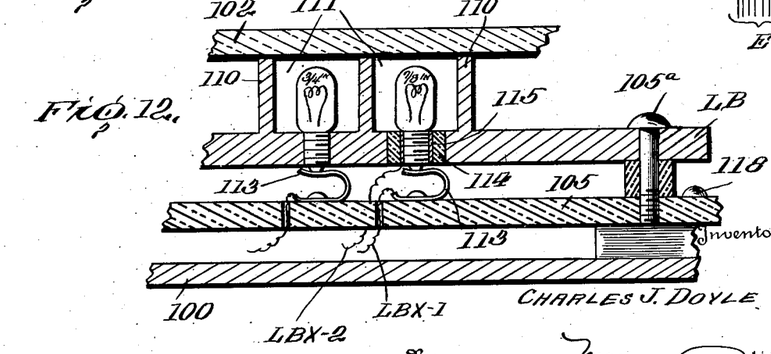
Figure 12 is an enlarged sectional view of a part of the indicator structure, substantially on line 12—12 of Figure 2.

The indicating housing is shown in Figures 2 and 12 as comprising a heavy base casting 100 to be secured to a wall, with a front closing plate comprising a frame 101 having two openings therein which are closed by the glass pane 102. In the preferred form, this glass pane is covered with an obscuring paint except for certain indicia as shown in Figures 2 and 12, from which it will be understood that the numerals and fractions are in effect transparent portions on the general glass pane. Below these panes (Figure 2) is provided a panel 103 in which are mounted the push buttons PA, PB . . . The conductors of cables NESFT and conductors CA and CB are brought through a sealed joint 104. Behind the panel 103, the base 100 is provided with an insulating board 105 having binding posts thereon on which connections are made from the conductors in the aforesaid cable. Further, a stepper relay SR is disposed within the housing and provided with coils SR10, SR20 for moving an armature SRA. This armature cooperates with contacts (Figure 13) so that contacts SR1, SR3 are closed upon movement in one direction and contact SR2 is closed upon movement in the other direction. Condensers SRC1 and SRC2 are connected across the effective gaps established at contacts SR1 and SR2 by the movement of the armature SRA, to avoid sparking at these contact points.

The lamp board LB is an internal panel of the assembly shown in Figure 1, and is formed as a casting with the columns of cups or receptacles for the lamp bulbs provided by the integral wall structures 110 which have the cavities 111 for receiving the individual bulbs. The cups extend to the rear surface of the glass panes 102 and prevent illumination of more than one numeral group in each column at a given time. This lamp board LB is of conductive material and is supported in spaced relation to the insulating terminal panel 105 by the screws 105a. The terminal panel 105 has individual spring contact pieces 113 for each central terminal of a lamp bulb: thus, the lamp bulbs indicated as "¾" and "⅞" in Figure 2 are shown in Figure 12. The structure for the "¾" bulb is the construction employed for all of the bulb supports except the "⅞" support. The bulb for "¾" is screwed directly into a threaded aperture in the lamp board LB, so that this lamp board provides a common return for all such bulbs. On the other hand, an insulation piece 114 is fitted into the lamp board LB for receiving a conductive threaded sleeve 115 for the "⅞" bulb: and conductors LBX—1 and LBX—2 are connected to this spring terminal 113 and to the sleeve for the "⅞" bulb, with connections as indicated in the diagram of Figure 13.

The insulation panel 105 is supported from the back or base casting 100 of the indicating station by screws 118 independently of the screws 105a, so that there is no metallic conduction between the lamp board LB and the base 100.

It will be understood that the parts of the indicating station are preferably formed for hermetic sealing, a rubber gasket 120 being included between the castings 100 and 101.

In operation, the transmitting unit for each tank responds to the liquid level in the tank. As the level rises in the particular tank, there is a counterclockwise movement of the pulley 20, shafts 34 and 49, plates 40 and 51, and the various brushes as seen in Figures 3, 4, 6 and 7; with a relatively clockwise movement of brushes over contacts as seen in Figures 10, 11 and 13. Thus, the mechanical system at the illustrated transmitting unit shifts as necessary to set up tentative circuit conditions at a plurality of elements corresponding in this illustrative form to units of height and to multiples and sub-multiples of such units, as a matter of pre-selection by which information may be transmitted. The actual transmission, however, does not occur until the appropriate selection is effected which is illustratively accomplished by depressing the desired push buttons PA, PB . . .

When the push button PA is depressed, current can flow from the source of supply SS by the common conductor C and through the push button PA, and common conductor CA leading to the tank A at which it is desired to obtain an indication of the existing liquid level. Current thus passes to the collector rings CEN and CFT at the testing disks for energizing these disks.

From the ring CEN of the "inches" testing disk EN, the current flows by the brush CEN—B to conductor SM21 which is connected on the one hand to the brushes NS—B and ES—B and on the other hand to one terminal of each of the stepper coils SM10, SM20. From the brush NS—B, current can pass to the segment of the ring NS which is presently located beneath this brush, and then by a corresponding conductor in the cable N (if the reading is from one to eleven inches inclusive) and to the central terminal 113 of the corresponding lamp base on the indication board, whereby to energize the corresponding lamp bulb and thence by the common return connection provided by the lamp board LB to the return conductor R, and thence back to the source of supply SS. It will be understood that this circuit permits the indication of the inches from 1 to 11 inclusive. It is unnecessary to indicate "12" or "zero" in the "inches" column, as this represents an even foot, and is read in the "feet" column.

In the "feet" disk FT, current from the ring CFT flows to the brush CFT—B and thence by a common conductor CFTX to the brushes TS—B and FS—B. The brush FS—B rests on one of the segments corresponding to the liquid level existing in the tank A, so that current can flow through the corresponding conductor in the cable F to the central terminal 113 of the lamp in the indicator board for designating the unit number of feet whereby to energize the corresponding lamp bulb with a return by a common base LB, and thence by return conductor R to the source of supply SS. Similarly, the brush TS—B permits current to flow to the segment of the ring TS which is present beneath this brush so that the current flows through the corresponding conductor T to the lamp bulb in the "tens of feet" column of the indicating structure, for energizing the corresponding lamp bulb therein, with a return by the common base LB and conductor R to the source of supply SS. Thus, in the "feet" testing disk FT, the brush TS—B rests on one segment, and will indicate for the decades of 10—20, 20—30 and 30—40, by correspondingly lighting the lamps "10", "20" and "30". It will be noted, that no lamp is provided for the "zero" decade (that is, for reading from zero feet to nine feet plus) as this reading is unnecessary. Furthermore, the segment of ring FS will also provide an indication within any decade; that is, when 13 feet of liquid is present, a "decade" lamp will be lighted to indicate "10" and a unit lamp will be lighted to indicate "3". Correspondingly, for 23 feet, the decade lamp for "20" will be lighted and the same unit lamp for "3" will be lighted. It will be noted that this is accomplished by repeating the group of segments on the ring FS for each segment on the ring TS, and by connecting the corresponding segments of FS together and to the corresponding conductor in the cable F. Further, it will be noted that in the illustrated form there is no provision for a lamp bulb in the "feet" column to designate "10", as this would be a repetition of the illumination in the "decade" column and might lead to a false interpretation of the readings.

The readings for the eighths of an inch are obtained in a similar manner at the "inches" disk EN, although the direction of current flow is somewhat different for "⅞". Current flowing to the brush ES—B moves to the segment of the ring ES which is present beneath it, and thence flows through the corresponding conductor of cable E to the central contact 113 of the corresponding lamp in the "eighths" column at the indicator board with a common return by the general base LB and return conductor R to the source of supply SS. This is the manner of obtaining indications except for "zero-eighths" and for "seven-eighths." As with the other readings, it is unnecessary to give an indication of the "zero" in the "eighths" column. In order to avoid a mis-reading at the change between inches, it is preferred to provide a separate path of flow for the "seven-eighths" and to employ the stepper relay SR and stepper motor SM. To this end, the conductor in cable E which is connected to the "seven-eighths" segments of the ring ES is connected to the coil SR10 of the stepper relay SR, the other terminal of this coil being connected to the common return conductor R and thence to the source of supply SS. Hence, when the brush ES—B rests on the "seven-eighths" segment, current flows and energizes the relay coil SR—10 and moves the armature SRA to engage the contacts SR1 and SR3. Current then flows from the source of supply SS by the common conductor C through the push button PA to the conductor LBX—1 to the central terminal 113 of the lamp bulb of the upper lamp in the "eighths" column for energizing this lamp to indicate "seven-eighths" with a separate return (independently of the common base LB) by conductor LBX—2 to the contact SR—3, through the armature SRA to the common return R, and thence back to the source of supply SS.

It will be noted, however, that current also flows, when the relay SR is closed towards the right, from the ring CEN by brush CEN—B and conductors 55, SM—11 and the coil SM—10 of the stepper motor, and thence by conductor S1 to collector ring SM1, by brush SM1—B, through a further portion of conductor S1 to the contact SR1, and by the common return R to the source of supply SS as before, thus energizing the stepper motor and causing its armature SMA to rock in a clockwise direction (Figure 6) so that the brush NS—B is detained on the segment of ring NS representing the lower value, and the transfer at the Geneva segment is delayed if the liquid level is rising. On the other hand, if the liquid level increases so that the brush ES—B moves on to the next "zero-eighths" segment of the ring ES, a path for current flow is then set up from brush ES—B to such segment, thence by the corresponding conductor of cable E to the coil SR20 of the stepper relay SR, with a return to the source of supply SS. The stepper relay SR then moves towards the left in Figure 13 breaking the circuit through the "seven-eighths" lamp bulb and contact SR3 and breaking the circuit through the motor coil SM10 at the contact SR1. Immediately thereafter, the contact SR2 is closed so that current can now flow from the common ring CEN of the "inch" disk EN, by brushes CEN—B and conductor SM21 of the stepper motor coil SM20 with a return by conductor S2 to the contact SR2 and thence through the armature SRA back to the source of supply SS. The motor coil SR20 causes the armature to rock in a counterclockwise direction in Figure 6 and carry with it the brush NS—B so that this brush is quickly swept from a position which partly overlaps the two adjacent "inch" segments on the ring NS and, hence, there is a quick transfer in the "inches" column of the indicator board from the illumination of the lower value lamp to the illumination of the higher value lamp. Therewith, there is a quick movement in the Geneva system which similarly causes the brushes TS—B and FS—B, if they are close to division lines between the sectors, to move quickly across these division lines. In this way, the indicator board does not give any indication in the higher value columns by having two lamps therein illuminated by the arresting of a brush on two adjacent contact segments.

The movement of the armature SMA produced by the action of the motor coils SM—10 and SM—20 corresponds substantially to the diameter of the brush NS—B. In operation, as the driving pulley 20 is being rotated in a counterclockwise direction (Figure 3) by the raising of the float 11 with increase of liquid level in the tank A, the brushes ES—B and CEN—B are being moved at an equiangular rate therewith, but the normal effect of the armature SMA is to be delayed by the frictional engagement of the brush NS—B with the contact ring NS, so that this brush is relatively "behind" in its movement. Therefore, when the brush ES—B overlaps the gap between "seven-eighths" and the adjacent "zero-eighths" contacts on the ring ES, while the liquid level is rising, the error of indication will be "low" by one-sixteenth of an inch or less if the armature SMA is not moved; or will be "high" by one-sixteenth of an inch or less if the armature is moved. A similar condition prevails if the float 11 is sinking, as then the brush NS—B will be retarded relatively in the opposite direction, so that the normal engagement of this brush NS—B will be "high." It will be understood that these effects occur only when the brush ES—B overlaps "seven-eighths" and "zero-eighths" segments at the moment of depressing a push button PA, PB, etc., for the corresponding transmitting device, or if the button is held depressed during a float movement which carries the brush into such overlapping position: and that this action does not occur at other transitions of the brush ES—B into overlapping engagement with other pairs of the "eighths" contact segments. Hence, the indicating board may show two of the "eighths" indicating lamps illuminated (thus indicating that the level is at the border line, so to speak, between the two adjacent readings), but the action of the armature SMA is to obtain a positive and quick shift at transitions from inch to inch, and thus (through the Geneva movement) from foot to foot and from "tens of feet" to the next "tens of feet," so that there will be at most a single lamp burning in the columns corresponding to "inches," "feet" and "tens of feet." Thus, there can be no confusion as to whether a particular indication is to be read as "one and zero-eighths" or "one and seven-eighths," etc.

It will be noted that if the push button PA is held depressed, the movement of the brushes over the contact segments, caused by changes in liquid level in the tank being measured, will cause corresponding changes in the electrical paths being established, and hence, the operator can observe the rise or fall of liquid level. When the push button PA is released the flow of current from the source of supply SS is interrupted and all lamps become extinguished by lack of energization.

While the circuits have been traced for the structure of one tank with a utilization of push button PA, it will be noted that similar conditions are created under control of the structure at another tank B if the corresponding push button PB is energized. Further, it will be noted that the selection between the tanks is accomplished at the push buttons by a selection of the common supply conductor CA, CB . . . : and that all of the other conductors in the cables N, E, S, F, T are common to the several tanks: but it will be understood that if one tank has a lesser depth than another, the lesser number of segments may be connected on the ring TS: and that, if desired, the segment ring TS may be divided into a greater or lesser number than four as illustrated, with a corresponding change in the gear ratio of drive through the Geneva movement.

While the system has been described with respect to its operation for a single tank, it will be understood that by use of corresponding transmitting units at a plurality of tanks, with a like number of selector push buttons, it is possible to selectively determine the contents of any desired number of tanks: and that the system may be established for reading in feet and decimals of feet, or in any other units appropriate for designating the contents of reservoirs or other storage chambers. In the broader aspect, the system comprises testing means for preparing by pre-selection of a plurality of elements calibrated for units, and multiples and/or sub-multiples of units, ready for the actual transmission of the information set up on these elements upon the actuation of a selector member, and receiving and indicating means for indicating the information as set up upon such plurality of elements, as units, and multiples and/or sub-multiples of units; the effect of the selector member is to give an immediate indication of the prevailing position of the elements at the transmitting device, and hence, the structure is available for many employments where such tentative conditions are set up at a transmitter in response to changes in the variable which is to be indicated, with an immediate indication upon appropriately actuating the selector means.

Having thus described the invention, what I claim as new and desire to secure by Letters Patent is:

1. A telemetric indicating system comprising a transmitting station mechanically responsive to changes of a variable, said transmitting station including a first segment ring having segments corresponding to particular values of the variable, and a second segment ring having groups of segments, each said group of segments corresponding to a segment in said first segment ring and each segment in a said group corresponding to a sub-multiple of the value of the variable as determined by the corresponding segment in said first segment ring, a third segment ring having segments corresponding to multiples of values of the variable, contactor means for selectively engaging segments in said rings during the mechanical response in said transmitting station, said contactor means for the first and second segments being connected for simultaneous equiangular movement during the major part of the response to the variable, and means for intermittently transmitting movement from said contactor means for the first segment ring to the contactor means for the third segment ring and effective to assure a quick stepwise movement of the last-named contactor means from its position of indicating one multiple of value to its position of indicating the next multiple of value; a receiving station including groups of individual indicating devices for each said ring; and transmission means including a source of supply, a control device therefor, and connecting means from said source and control device to said rings and to said indicating devices and including individual paths selectively energized from said source under control of said segment rings for selectively producing energization of an indicating device in each said group whereby to indicate the prevailing condition of the variable.

2. A telemetric indicating system comprising a transmitting station mechanically responsive to changes of a variable, said transmitting station including a first group of relatively movable contact members, one said contact member comprising first and second segment rings, said first ring having segments corresponding to particular values of the variable, said second segment ring having groups of segments, each group of segments corresponding to a segment in said first segment ring and each segment of said second segment ring corresponding to a sub-multiple of the value of the variable as determined by a segment in said first segment ring, said other contact member including brushes selectively engaged with the segments in said rings according to the prevailing condition of the variable, a second group of relatively movable contact members comprising a third segment ring having segments corresponding to multiples of units of values of the variable, and a contact brush engaged with said third segment ring, means for quickly effecting relative movement of said second group of contact members through a distance equivalent to the arcuate length of a segment therein upon completion of a full revolution of relative movement in said first group; a receiving station including groups of individual indicating devices for each said segment ring; a source of electric current, conductors joining said source and segment rings and indicating devices, said conductors including first conductors joining segments in the first segment ring to individual indicating devices in the first group for indicating said particular values of the variable and also including second conductors joining like segments of the second ring together and to a corresponding indicating device in the second group for indicating at said indicating device the like sub-multiples of the values indicated in said first group of individual indicating devices and also including third conductors joining segments in the third segment ring to individual indicating devices in the third group for indicating multiples of the values indicated in the said first group, whereby to indicate the prevailing condition of the variable by values and multiples and sub-multiples thereof.

3. A telemetric indicating system comprising a transmitting station mechanically responsive to changes of a variable, said transmitting station including a first member moved in accordance with said changes and a relatively stationary second member, said first member having a plurality of contact brushes thereon, said relatively stationary second member having first and second segment rings, said first ring being divided into arcuate segments of like arcuate length each representing a particular value of the variable, the second segment ring comprising groups of segments, each segment representing a sub-multiple of such value, the groups of segments in the second segment ring each being constructed and arranged to correspond in arcuate length with the length of segments in said first ring, like segments in each said group being connected together electrically, a third segment ring having segments representing multiples of values corresponding to the total number of units represented by said first ring, a third rotatable brush engaged with said third segment ring, and means for intermittently transmitting movement from said first member to said third brush and effective to assure quick stepwise movement of the said third brush from its position of engagement with one segment of said third segment ring to a position of engagement with an adjacent segment of said third segment ring upon the completion of a full rotation of said first member; a receiving station including groups of individual indicating devices for each said segment ring; and transmission means including a source of supply and conductors extending from said source to said segments and brushes and to said indicating devices; segments of said first ring being connected to the individual indicating devices for indicating said values; and the connected like segments in said second ring being connected to the individual indicating devices for indicating sub-multiples of the values indicated by said first indicating devices.

4. A telemetric indicating system comprising a transmitting station having a first shaft with a revoluble member secured thereto, a first relatively stationary member having groups of contacts thereon, means on said revoluble member of the first shaft for selectively engaging said contacts according to the prevailing condition of the variable, a second shaft having a revoluble member thereon, a second stationary member having groups of contacts, means on the revoluble member of said second shaft for selectively engaging the contacts of said second stationary member according to the prevailing condition of the variable, and Geneva transfer means connecting said first shaft with said second shaft whereby the contacts on said second stationary member are selectively engaged for indicating multiples of the values represented by the contacts on said first stationary member; a receiving station including groups of individual indicating devices; and transmission means including a source of electric current and conductors individually associating said groups of contacts with individual indicating devices whereby the position of said contact means on said revoluble members will effect an indication at a corresponding indicating device in each said group.

5. A telemetric indicating system comprising a transmitting station mechanically responsive to changes of a variable, said transmitting station including first and second contact devices including groups of contacts which are selectively engaged according to the prevailing condition of the variable, transfer means for driving said second shaft from said first shaft and including a Geneva transfer structure for quickly moving said second shaft at a predetermined point in the course of a revolution of the first shaft, and also including auxiliary means for energizing the Geneva transfer structure independently of the movement of said first shaft; a receiving station including groups of individual indicating devices; transfer means including a source of supply, and conductors connected with said source and to the said contacts and indicating devices for producing selective energization of the indicating devices in accordance with the engagement of said contacts; and means energized through said contacts substantially at the said point in the revolution of said first shaft for effecting a movement in said auxiliary means whereby to effect a rapid movement of said second shaft and thereby prevent false indications by overlapping engagement of contacts controlled by said second shaft.

6. A telemetric indicating system comprising a transmitting station mechanically responsive to changes of a variable, said transmitting station including a first shaft having a revoluble member thereon, a first relatively stationary member having first and second segment rings, brushes in said first revoluble member for selectively engaging the segments of said rings, the first segment ring having arcuate segments corresponding to integer values of the variable, the second segment ring having groups of segments, each group of segments corresponding to an integer value of the variable, and each segment in the group corresponding to a sub-multiple of the integer value, a second shaft having a second revoluble member thereon, a second relatively stationary member having a third segment ring, means on the second revoluble member for selectively contacting the segments of said third ring, a stepper motor including parts moved with said first shaft and first revoluble member and other parts, a Geneva transfer structure connected with said other parts and effective for moving said second shaft; a receiving station including a group of indicating devices for each segment ring; and transmission means including a source of supply and conductors connecting said source with the segments and with said devices for selectively energizing the devices in accordance with the prevailing condition of the variable, said transmission means also including means energized from contacts of said second contact ring substantially at the completion of a revolution of the first shaft for effecting an actuation of the stepper motor.

7. A telemetric indicating system including a transmitting station mechanically responsive to changes of a variable, said transmitting station including a first shaft having a revoluble member thereon and directly responsive to the changes of the variable, a second shaft having a second revoluble member thereon, means for intermittently transmitting motion from said first shaft to said second shaft, and means constructed and arranged to be effective at the instants of intermittent movement of the second shaft for assuring a quick stepwise movement of the second shaft, and devices selectively controlled by said revoluble members for establishing indications of prevailing positions of said shafts.

8. A telemetric indicating system comprising a transmitting station mechanically responsive to changes of a variable, said transmitting station including a first segment ring having segments corresponding to particular values of the variable, and a second segment ring having groups of segments, each said group of segments corresponding to a segment in said first segment ring and each segment in a said group corresponding to a sub-multiple of the value of the variable as determined by the corresponding segment in said first segment ring, and means for selectively engaging segments in said rings during the mechanical response in said transmitting station; a receiving station including groups of individual indicating devices for each said ring; and transmission means including a source of supply, a control device therefor, and connecting means from said source and control device to said rings and to said indicating devices and including individual paths selectively energized from said source under control of said segment rings for selectively producing energization of an indicating device in each said group whereby to indicate the prevailing condition of the variable; said selectively engaging means including a contact member engageable with the first segment ring and of a size to make contact with two segments of said first segment ring at the transition between the particular values represented by such segments, and means for supporting said contact member and for moving it rapidly from one said segment to another at the time of transition, whereby only one individual indicating device will be energized at a time under control of said first segment ring.

9. A telemetric indicating system comprising a transmitting station mechanically responsive to changes of a variable, said transmitting station including relatively movable contact members, one said contact member comprising first and second segment rings, said first ring having segments corresponding to particular values of the variable, said second segment ring having groups of segments, each group of segments corresponding to a segment in said first segment ring and each segment of said second segment ring corresponding to a sub-multiple of the value of the variable as determined by a segment in said first segment ring, said other contact member including brushes selectively engaged with the segments in said rings according to the prevailing condition of the variable; a receiving station including groups of individual indicating devices for each said segment ring; a source of electric current, conductors joining said source and segment rings and indicating devices, said conductors including first conductors joining segments in the first segment ring to individual indicating devices in the first group for indicating said particular values of the variable and also including further conductors joining like segments of the second ring together and to a corresponding indicating device for indicating at said indicating device the like sub-multiples of the values indicated in said first group of individual indicating devices, whereby to indicate the prevailing condition of the variable by values and sub-multiples thereof; and means for shifting a brush engaged with the first segment ring from one segment thereof to the adjacent segment rapidly at the transition between the corresponding values of the variable.

10. A telemetric indicating system including a receiving station having a plurality of devices arranged to indicate the prevailing values of a variable, a transmitting station mechanically responsive to changes of the variable and including two cooperating circuit-selecting members, one of said members having a plurality of selector elements and the other member having a contactor, means mechanically responsive to changes of the variable for moving one of said members relative to the other, individual circuits connecting said members with the devices for energizing the latter selectively, and means for quickly displacing one of said members relative to the other at the transition from one selected value to an adjacent value, said displacement being effected through a distance equivalent to the peripheral dimension of the contactor, whereby to effect a quick shifting past the transition point and to eliminate a dual indication through the corresponding two devices by a maintained bridging engagement of the contactor with two said selector elements.

11. A telemetric indicating system for indicating the height of an inflammable vaporizable liquid in a receptacle, comprising a transmitting station including a float responsive to the liquid level, an oil-filled housing, a tape connected to the float, guide means for introducing the tape into the housing at a point above the liquid level therein, sealing conduits surrounding the tape and connecting the receptacle and housing for preventing escape of vapors therefrom, and circuit-selecting control means actuated from the float to effect energization of selected circuits corresponding to values of said height of liquid and including circuit-selecting contactors immersed in the oil in the housing; a receiving station for remotely indicating said values and including a plurality of indicating devices; and circuits including a source of current for connecting said control means and devices for selective energization of said device under selection by said control means.

CHARLES J. DOYLE.